US011143892B2

(12) United States Patent
Sugino et al.

(10) Patent No.: US 11,143,892 B2
(45) Date of Patent: Oct. 12, 2021

(54) DIMMING ELEMENT INCLUDING GLASS FILM

(71) Applicant: NITTO DENKO CORPORATION, Ibaraki (JP)

(72) Inventors: Akiko Sugino, Ibaraki (JP); Kenta Watanabe, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/979,633

(22) PCT Filed: Mar. 22, 2019

(86) PCT No.: PCT/JP2019/011955
§ 371 (c)(1),
(2) Date: Sep. 10, 2020

(87) PCT Pub. No.: WO2019/188736
PCT Pub. Date: Oct. 3, 2019

(65) Prior Publication Data

US 2021/0026183 A1 Jan. 28, 2021

(30) Foreign Application Priority Data

Mar. 28, 2018 (JP) ............................ JP2018-061556

(51) Int. Cl.
*G02F 1/1333* (2006.01)
*G02F 1/153* (2006.01)

(52) U.S. Cl.
CPC ...... *G02F 1/133305* (2013.01); *G02F 1/1533* (2013.01); *G02F 2202/28* (2013.01)

(58) Field of Classification Search
CPC ................................................ G02F 1/133305
See application file for complete search history.

(56) References Cited

U.S. PATENT DOCUMENTS 8,059,331 B2 11/2011 Higashida et al.
2010/0007829 A1* 1/2010 Oikawa ............ G02F 1/133305 349/122
2010/0014150 A1* 1/2010 Higashida ......... B32B 17/10532 359/296

(Continued)

FOREIGN PATENT DOCUMENTS

CN 106082711 A 11/2016
JP 2013-148687 A 8/2013

(Continued)

OTHER PUBLICATIONS

International Search Report dated Jun. 11, 2019, issued in counterpart application No. PCT/JP2019/011955 (2 pages).

*Primary Examiner* — Sang V Nguyen
(74) *Attorney, Agent, or Firm* — Westerman, Hattori, Daniels & Adrian, LLP

(57) ABSTRACT

The present invention provides a light control element which has a light weight and high reliability and can easily be bonded to a glass surface or the like. The light control element of the present invention includes a glass film, a light control layer, a resin film, and a pressure-sensitive adhesive layer in the stated order, wherein the light control element has a bending radius of from 20 mm to 100 mm, and wherein the glass film has a thickness of from 50 μm to 200 μm.

10 Claims, 2 Drawing Sheets

100a

(56) References Cited

U.S. PATENT DOCUMENTS

| | | | | |
|---|---|---|---|---|
| 2014/0132883 | A1* | 5/2014 | Roberts | G02B 6/006 349/62 |
| 2015/0210588 | A1* | 7/2015 | Chang | H05K 1/028 361/750 |
| 2017/0293194 | A1* | 10/2017 | Hou | G02F 1/13306 |
| 2018/0281352 | A1 | 10/2018 | Aoki | |
| 2019/0122784 | A1* | 4/2019 | Fujino | H01B 5/14 |
| 2020/0166694 | A1* | 5/2020 | Sugino | G02B 6/0005 |

FOREIGN PATENT DOCUMENTS

| | | | | |
|---|---|---|---|---|
| JP | 2015-071284 A | | 4/2015 | |
| JP | 2015071284 | * | 4/2015 | B32B 27/00 |
| JP | 2017-092033 A | | 5/2017 | |
| WO | 2008/075773 A1 | | 6/2008 | |
| WO | 2017/099167 A1 | | 6/2017 | |

* cited by examiner

[Fig.1]
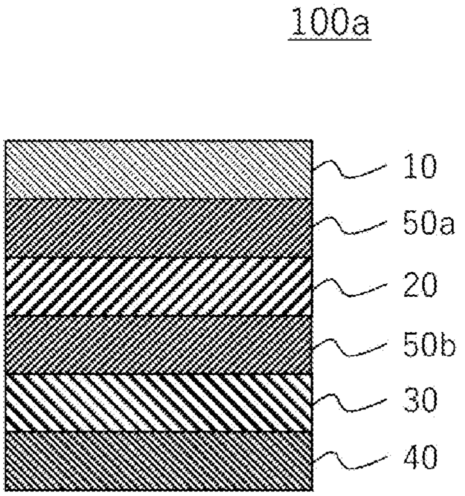
[Fig.2]
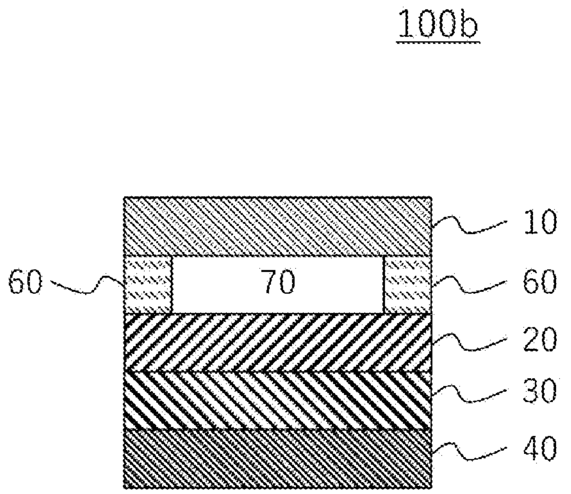

[Fig.3]
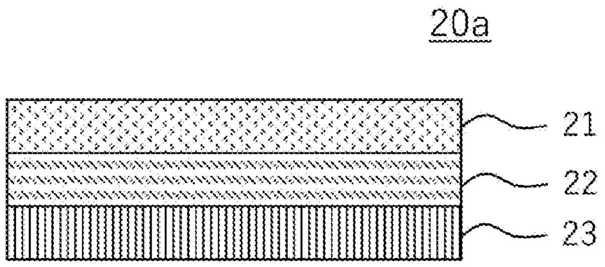
[Fig.4]
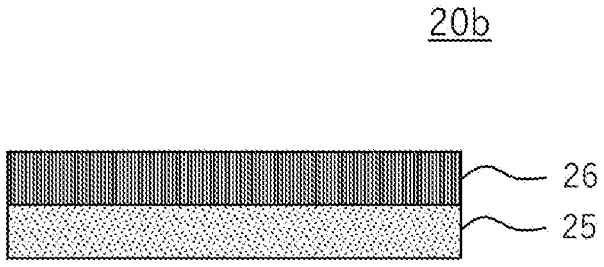

DIMMING ELEMENT INCLUDING GLASS FILM

TECHNICAL FIELD

The present invention relates to a light control element including a glass film.

BACKGROUND ART

A light control element has hitherto been used as a window glass of a building, a vehicle, or the like, or as an interior material. In particular, in recent years, from the viewpoints of, for example, reducing a heating and cooling load, reducing a lighting load, and improving comfort, the demand and expectation for the light control element have been increased.

As the light control element, for example, an electric field driving mode involving using a liquid crystal material or an electrochromic material and controlling a light transmittance through application of an electric field, a thermochromic mode involving changing a light transmittance with a temperature, and a gasochromic mode involving controlling a light transmittance through control of an atmosphere gas have been developed. The light control elements of those modes are each used, for example, as a light control glass in which a light control layer is sandwiched between two glass sheets. In addition, a technology for bonding a light control film in which a light control layer is sandwiched between two resin films to a glass surface has been also proposed (Patent Literature 1).

The light control glass in which a light control layer is sandwiched between two glass sheets has a significantly heavy weight, and its construction is troublesome. Meanwhile, the light control film as disclosed in Patent Literature 1 achieves a reduction in weight, but has problems in that a surface thereof is liable to be flawed and the film deteriorates with time.

CITATION LIST

Patent Literature

[PTL 1] JP 2015-71284 A

SUMMARY OF INVENTION

Technical Problem

The present invention has been made in order to solve the above-mentioned problems, and a primary object of the present invention is to provide a light control element which has a light weight and high reliability and can easily be bonded to a glass surface or the like.

Solution to Problem

According to one embodiment of the present invention, there is provided a light control element, including a glass film, a light control layer, a resin film, and a pressure-sensitive adhesive layer in the stated order, wherein the light control element has a bending radius of from 20 mm to 100 mm. The glass film has a thickness of from 50 μm to 200 μm.

In one embodiment, the resin film has a thickness of from 20 μm to 200 μm, and the resin film has a modulus of elasticity at 23° C. of from 2 GPa to 10 GPa.

In one embodiment, the pressure-sensitive adhesive layer has a thickness of from 20 μm to 200 μm, and the pressure-sensitive adhesive layer has a modulus of elasticity at 23° C. of from $1\times10^{-5}$ GPa to $1\times10^{-2}$ GPa.

In one embodiment, a thickness of the light control element from the glass film to the pressure-sensitive adhesive layer is from 70 μm to 500 μm.

According to another embodiment of the present invention, there is provided a glass film roll with a light control layer, including a glass film having an elongated shape and a light control layer laminated on one side of the glass film, wherein the glass film has a thickness of from 50 μm to 200 μm.

Advantageous Effects of Invention

According to the present invention, out of two base materials configured to sandwich the light control layer, the glass film having the predetermined thickness serves as one base material, and the pressure-sensitive adhesive layer is arranged on an outside of the other base material. With this, the light control element which has a light weight and high reliability, and can easily be bonded to a glass surface or the like can be obtained.

BRIEF DESCRIPTION OF DRAWINGS

FIG. 1 is a schematic sectional view of a light control element according to one embodiment of the present invention.

FIG. 2 is a schematic sectional view of a light control element according to another embodiment of the present invention.

FIG. 3 is a schematic sectional view of an example of a light control layer including an electrochromic material.

FIG. 4 is a schematic sectional view of an example of a light control layer including a gasochromic material.

DESCRIPTION OF EMBODIMENTS

Preferred embodiments of the present invention are described below, but the present invention is not limited to these embodiments. The "elongated shape" as used herein means a long thin shape having a sufficiently large length with respect to a width, and includes, for example, a long thin shape having a length 10 times or more, preferably 20 times or more as large as the width.

A. Light Control Element

A light control element of the present invention includes a glass film, a light control layer, a resin film, and a pressure-sensitive adhesive layer in the stated order. Out of two base materials configured to sandwich the light control layer, the resin film serves as one base material which is to be bonded to a glass surface or the like, and the thin glass film serves as the other base material. With this, while reliability, such as scratch resistance and impact resistance, is imparted to an exposure surface of the light control element, a reduction in weight can be achieved. In addition, the light control element of the present invention has flexibility, and hence can be taken up into a roll shape. Further, the light control element of the present invention has a light weight and includes the pressure-sensitive adhesive layer, and hence can easily be bonded to a glass surface or the like.

A-1. Overall Configuration of Light Control Element

FIG. 1 is a schematic sectional view of a light control element according to one embodiment of the present invention. Alight control element 100*a* illustrated in FIG. 1 is a light control element of an electric field driving mode, and includes a glass film 10, a light control layer 20, a resin film 30, and a pressure-sensitive adhesive layer 40 in the stated order. The light control element 100*a* further includes, between the glass film 10 and the light control layer 20 and between the light control layer 20 and the resin film 30, transparent electrode layers 50*a* and 50*b* configured to apply a voltage to the light control layer 20. In this embodiment, the light control layer 20 contains, for example, a liquid crystal compound or an electrochromic material.

FIG. 2 is a schematic sectional view of a light control element according to another embodiment of the present invention. A light control element 100*b* illustrated in FIG. 2 is a light control element of a gasochromic mode, and includes a glass film 10, a light control layer 20, a resin film 30, and a pressure-sensitive adhesive layer 40 in the stated order. In the illustrated example, through intermediation of a spacer 60 between the glass film 10 and the light control layer 20, the light control element 100*b* has a void 70 configured to introduce a gas. However, the spacer 60 may be omitted as long as the void configured to introduce a gas is ensured. In this embodiment, the light control layer 20 contains a gasochromic material.

The light control element of the present invention may be a light control element of a mode different from those of the illustrated examples (e.g., a thermochromic mode or a photochromic mode). In addition, as required, a release film may be laminated on a side of the pressure-sensitive adhesive layer on which the resin film is not arranged.

The thickness of the light control element (thickness from the glass film to the pressure-sensitive adhesive layer) is, for example, from 70 μm to 500 μm, preferably from 80 μm to 450 μm, more preferably from 100 μm to 400 μm, still more preferably from 140 μm to 400 μm.

The bending radius of the light control element is, for example, from 20 mm to 100 mm, preferably from 20 mm to 90 mm, more preferably from 20 mm to 80 mm. When the light control element has a bending radius falling within the above-mentioned ranges, the light control element is excellent in flexibility, and hence can be taken up into a roll shape to form a film roll. In addition, handleability at the time of bonding the light control element to a glass surface or the like is satisfactory.

A-2. Glass Film

Any appropriate glass film may be adopted as the glass film. As glass for forming the glass film, according to classification based on a composition, there are given, for example, soda lime glass, borate glass, aluminosilicate glass, and quartz glass. In addition, according to classification based on an alkali component, there are given alkali-free glass and low-alkali glass.

The content of an alkali metal component (e.g., $Na_2O$, $K_2O$, or $Li_2O$) in the glass is preferably 15 wt % or less, more preferably 10 wt % or less.

The total light transmittance of the glass film is, for example, 80% or more, preferably 85% or more, more preferably 90% or more.

The thickness of the glass film is, for example, from 50 μm to 200 μm, preferably from 50 μm to 180 μm. When the thickness of the glass film is less than 50 μm, the impact resistance becomes insufficient in some cases. Meanwhile, when the thickness of the glass film is more than 200 μm, the flexibility of the light control element is reduced, and the weight thereof is increased, and hence handleability at the time of bonding the light control element to a glass surface or the like may be reduced.

A-3. Resin Film

A material for forming the resin film is typically a thermoplastic resin. Examples of the thermoplastic resin include: a polyester-based resin, such as PET; a cycloolefin-based resin, such as polynorbornene; an acrylic resin; a polycarbonate resin; and a cellulose-based resin. Of those, a polyester-based resin, a cycloolefin-based resin, or an acrylic resin is preferred. Those resins are each excellent in, for example, transparency, mechanical strength, thermal stability, and water barrier property. Those thermoplastic resins may be used alone or in combination thereof. In addition, an optical film to be used in a polarizing plate, for example, a low-retardation base material, a high-retardation base material, a retardation plate, or a brightness enhancement film may also be used.

The modulus of elasticity (tensile modulus of elasticity) at 23° C. of the resin film may be preferably from 2 GPa to 10 GPa, more preferably from 2 GPa to 6 GPa. When the resin film has a modulus of elasticity falling within the above-mentioned ranges, a glass material having high brittleness is suitably supported, and as a result, a light control element excellent in flexibility can be obtained.

The thickness of the resin film is preferably from 20 μm to 200 μm, more preferably from 30 μm to 200 μm, still more preferably from 30 μm to 150 μm. When the resin film has a thickness falling within the above-mentioned ranges, the glass material having high brittleness can be suitably supported, and the thickness of the light control element can be reduced. As a result, alight control element excellent in flexibility can be obtained.

The total light transmittance of the resin film is preferably 60% or more, more preferably 70% or more, still more preferably 80% or more.

A-4. Light Control Layer

A-4-1. Light Control Layer Containing Liquid Crystal Compound

A light control layer containing a liquid crystal compound is typically formed by dispersing a liquid crystal compound in a polymer matrix. In the light control layer, a light transmitting state and a light scattering state can be switched by changing the degree of alignment of the liquid crystal compound based on the presence or absence of the application of a voltage.

In one embodiment, the light control layer is in the light transmitting state at the time of application of a voltage, and the light control layer is in the light scattering state at the time of application of no voltage (normal mode). In this embodiment, the liquid crystal compound is not aligned at the time of application of no voltage, resulting in the light scattering state. When a voltage is applied, the liquid crystal compound is aligned, and the refractive index of the liquid crystal compound and the refractive index of the polymer matrix match with each other, resulting in the light transmitting state.

In another embodiment, the light control layer is in the light scattering state at the time of application of a voltage, and the light control layer is in the light transmitting state at the time of application of no voltage (reverse mode). In this embodiment, with an alignment film arranged on a surface of the transparent electrode layer, the liquid crystal compound is aligned at the time of application of no voltage, resulting in the light transmitting state. When a voltage is applied, the alignment of the liquid crystal compound is disturbed, resulting in the light scattering state.

Examples of the light control layer as described above include a light control layer containing a polymer-dispersed liquid crystal and a light control layer containing a polymer-network liquid crystal. The polymer-dispersed liquid crystal has a structure in which a liquid crystal compound in the form of droplets is dispersed in a polymer matrix. The polymer-network liquid crystal has a structure in which a liquid crystal compound is dispersed in a polymer network. The liquid crystal has a continuous phase in the polymer network.

Any appropriate liquid crystal compound of a non-polymeric type is used as the liquid crystal compound. The liquid crystal compound may have positive dielectric anisotropy or negative dielectric anisotropy. Examples of the liquid crystal compound may include nematic, smectic, and cholesteric liquid crystal compounds. A nematic liquid crystal compound is preferably used because excellent transparency can be achieved under the light transmitting state. Examples of the nematic liquid crystal compound include a biphenyl-based compound, a phenyl benzoate-based compound, a cyclohexylbenzene-based compound, an azoxybenzene-based compound, an azobenzene-based compound, an azomethine-based compound, a terphenyl-based compound, a biphenyl benzoate-based compound, a cyclohexylbiphenyl-based compound, a phenylpyridine-based compound, a cyclohexylpyrimidine-based compound, a cholesterol-based compound, and a fluorine-based compound.

The content of the liquid crystal compound in the light control layer is, for example, 40 wt % or more, preferably from 50 wt % to 99 wt %, more preferably from 50 wt % to 95 wt %.

A resin for forming the polymer matrix may be appropriately selected depending on, for example, the light transmittance and the refractive index of the liquid crystal compound. The resin may be an optically isotropic resin or may be an optically anisotropic resin. In one embodiment, the resin is an active energy ray-curable resin. For example, a liquid crystal polymer obtained by curing a polymerizable liquid crystal compound, a (meth)acrylic resin, a silicone-based resin, an epoxy-based resin, a fluorine-based resin, a polyester-based resin, and a polyimide resin may be preferably used.

The content of the polymer matrix in the light control layer is preferably from 1 wt % to 60 wt %, more preferably from 5 wt % to 50 wt %. When the content of the polymer matrix is less than 1 wt %, a problem of, for example, a reduction in adhesiveness with a transparent electrode layer may occur. Meanwhile, when the content of the polymer matrix is more than 60 wt %, a problem of, for example, an increase in driving voltage or a reduction in light control function may occur.

The thickness of the light control layer may be, for example, from 10 μm to 100 μm, preferably from 15 μm to 60 μm.

A-4-2. Light Control Layer Containing Electrochromic Material

FIG. 3 is a schematic sectional view of an example of a light control layer containing an electrochromic material which can be used in the present invention. A light control layer 20*a* containing an electrochromic material includes a first electrochromic compound layer 21 (first EC layer), an electrolyte layer 22, and a second electrochromic compound layer 23 (second EC layer) in the stated order. The thickness of the light control layer 20*a* is, for example, from 0.1 μm to 400 μm, preferably from 0.5 μm to 200 μm.

The first EC layer, along with the second EC layer described later, is a light control layer configured to change its light transmittance or color in accordance with an electric current flowing in the first EC layer.

An electrochromic compound for forming the first EC layer is not limited, and examples thereof include: inorganic electrochromic compounds, such as tungsten oxide (e.g., $WO_3$), molybdenum oxide, vanadium oxide, indium oxide, iridium oxide, nickel oxide, and Prussian blue; and organic electrochromic compounds, such as a phthalocyanine-based compound, a styryl-based compound, a viologen-based compound, polypyrrole, polyaniline, and polythiophene (e.g., poly(ethylene dioxythiophene)-poly(styrene-sulfonate)). Preferred examples thereof include tungsten oxide and polythiophene.

The thickness of the first EC layer 21 is, for example, 0.01 μm or more, preferably 0.05 μm or more, and is, for example, 40 μm or less, preferably 20 μm or less.

The electrolyte layer is a layer configured to efficiently achieve electrical conduction to the electrochromic compounds in the first EC layer and the second EC layer.

The electrolyte layer may be formed of a liquid electrolyte and a sealing material for sealing the liquid electrolyte, or may be formed of a solid electrolyte film.

The electrolyte for forming the electrolyte layer is not limited, and examples thereof include alkali metal salts and alkaline earth metal salts, such as $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$. The examples also include quaternary ammonium salts and quaternary phosphonium salts.

When the liquid electrolyte is used as the electrolyte layer, an organic solvent is preferably used in combination with the electrolyte. The organic solvent is not limited as long as the electrolyte can be dissolved therein, and examples thereof include: carbonates, such as ethylene carbonate, propylene carbonate, and methyl carbonate; furans, such as tetrahydrofuran; and γ-butyrolactone, 1,2-dimethoxyethane, 1,3-dioxolane, 4-methyl-1,3-dioxolane, methyl formate, methyl acetate, methyl propionate, acetonitrile, propylene carbonate, and N,N-dimethylformamide.

A preferred example of the electrolyte layer is an electrolyte film including the electrolyte, the organic solvent, and a binder resin. Such electrolyte layer is obtained, for example, by mixing: an electrolyte solution in which the electrolyte is dissolved in the organic solvent; and the binder resin, followed by drying.

An example of the binder resin is an acrylic resin, such as polymethyl methacrylate.

The thickness of the electrolyte layer is, for example, 0.01 μm or more, preferably 0.1 μm or more, and is, for example, 300 μm or less, preferably 100 μm or less.

The same description as that of the first EC layer can be applied to the second EC layer. The second EC layer may have the same configuration as or a different configuration from that of the first EC layer.

A-4-3. Light Control Layer Containing Gasochromic Material

FIG. 4 is a schematic sectional view of an example of a light control layer containing a gasochromic material which can be used in the present invention. A light control layer 20*b* containing a gasochromic material includes a gasochromic compound layer 25 (GC layer) and a catalyst layer 26. The light control layer 20*b* containing a gasochromic material is typically arranged so that the catalyst layer 26 is brought into contact with a gas (on a void side).

The GC layer contains a chromic material which is reversibly changed in state between a transparent state caused by hydrogenation and a reflection state caused by dehydrogenation. Specific examples of the chromic material for forming the GC layer include: rare earth metals, such as Y, La, Gd, and Sm; alloys of rare earth metals and magnesium; alloys of alkaline earth metals, such as Ca, Sr, and Ba, and magnesium; and alloys of transition metals, such as Ni, Mn, Co, and Fe, and magnesium. The GC layer preferably contains magnesium because such GC layer is excellent in transparency when hydrogenated. Alloys of rare earth metal elements and magnesium are more preferred from the viewpoint of achieving both transparency and durability. The GC layer may contain an element other than the alloy as a trace component.

The above-mentioned metal or alloy for forming the GC layer includes a metal element which becomes a transparent state when hydrogenated, and which becomes a reflection state when releasing hydrogen. For example, magnesium becomes transparent $MgH_2$ when hydrogenated, and becomes Mg showing metal reflection when dehydrogenated.

The thickness of the GC layer is not particularly limited, but from the viewpoint of achieving both a light transmittance in the transparent state and a light shielding rate (reflectance) in the reflection state, is preferably from 10 nm to 500 nm, more preferably from 15 nm to 200 nm, still more preferably from 20 nm to 100 nm. When the thickness of the GC layer is excessively small, the light reflectance in the reflection state tends to be reduced. In addition, when the thickness of the GC layer is excessively large, the light transmittance in the transparent state tends to be reduced.

The catalyst layer has a function of promoting the hydrogenation and dehydrogenation of the GC layer. When the catalyst layer is arranged on the GC layer, the switching rates of switching from the reflection state to the transparent state (hydrogenation of the GC layer) and switching from the transparent state to the reflection state (dehydrogenation of the GC layer) are increased.

A material for forming the catalyst layer is not particularly limited as long as the material has a function of promoting the hydrogenation and dehydrogenation of the GC layer, but preferably includes, for example, at least one kind of metal selected from palladium, platinum, a palladium alloy, and a platinum alloy. In particular, palladium is suitably used because of having high hydrogen permeability.

The thickness of the catalyst layer may be appropriately set depending on, for example, the reactivity of the GC layer and the catalytic ability of the catalyst layer. The thickness of the catalyst layer is, for example, from 1 nm to 30 nm, preferably from 2 nm to 20 nm. When the thickness of the catalyst layer is excessively small, the catalytic function on the hydrogenation and dehydrogenation is not sufficiently exhibited in some cases. In addition, when the thickness of the catalyst layer is excessively large, the light transmittance tends to be reduced.

The GC layer and the catalyst layer may be sequentially formed on the resin film by a sputtering method.

The light control layer 20*b* containing a gasochromic material may further include a layer other than the GC layer 25 and the catalyst layer 26 as required. For example, a base layer may be arranged on a side of the GC layer on which the catalyst layer is not arranged (e.g., between the resin film and the GC layer), or a buffer layer may be arranged between the GC layer and the catalyst layer. In addition, a surface layer may be arranged on the catalyst layer.

When an inorganic oxide layer is formed as the base layer between the resin film and the GC layer, water, an oxygen gas, or the like generated from the resin film is blocked, and the oxidation of the GC layer can be suppressed. In addition, when a metal thin film formed of, for example, Ti, Nb, V, or an alloy of any of these metals is arranged as the buffer layer between the GC layer and the catalyst layer, while the migration of magnesium or the like from the GC layer to the catalyst layer is suppressed, the switching rate of switching from the transparent state to the reflection state caused by the dehydrogenation tends to be increased. The surface layer may have a function of blocking the permeation of water or oxygen to prevent the oxidation of the GC layer. In addition, when the optical thickness of the surface layer is adjusted, light reflection is reduced, and the light transmittance in the transparent state can be increased. As a material for forming the surface layer, there are given, for example, an inorganic material, such as an inorganic oxide, an organic material, such as a polymer, and an organic-inorganic hybrid material.

A-5. Transparent Electrode Layer

The transparent electrode layers may be each formed of, for example, a metal oxide, such as indium tin oxide (ITO), zinc oxide (ZnO), or tin oxide ($SnO_2$). Alternatively, the transparent electrode layer may be formed of a metal nanowire such as a silver nanowire (AgNW), a carbon nanotube (CNT), an organic conductive film, a metal layer, or a laminate thereof. The transparent electrode layer may be patterned into a desired shape depending on the purposes.

The total light transmittance of the transparent electrode layer is preferably 80% or more, more preferably 85% or more, still more preferably 90% or more.

The surface resistance value of the transparent electrode layer is preferably from 0.1 Ω/□ to 1,000 Ω/□, more preferably from 0.5 Ω/□ to 500 Ω/□, still more preferably from 1 Ω/□ to 250 Ω/□.

The thickness of the transparent electrode layer is preferably from 0.01 μm to 0.06 μm, more preferably from 0.01 μm to 0.045 μm. When the thickness of the transparent electrode layer falls within the above-mentioned ranges, an electrode layer excellent in conductivity and light transmitting property can be obtained.

The transparent electrode layer may be formed on the glass film or the resin film by a method such as sputtering. The transparent electrode layer may be directly formed on those films, or as required, may be formed through intermediation of, for example, a refractive index adjusting layer or a support base material.

A-6. Pressure-Sensitive Adhesive Layer

Any appropriate pressure-sensitive adhesive composition may be used as a pressure-sensitive adhesive composition for forming the pressure-sensitive adhesive layer. Specific examples of the usable pressure-sensitive adhesive composition include pressure-sensitive adhesive compositions containing, as base polymers, a (meth)acrylic polymer, a silicone-based polymer, polyester, polyurethane, polyamide, polyether, a fluorine-based polymer, a rubber-based polymer, and the like. Of those, from the viewpoints of, for example, transparency, weather resistance, and heat resistance, an acrylic pressure-sensitive adhesive composition containing an acrylic polymer as a base polymer is preferred.

The pressure-sensitive adhesive composition may further contain any appropriate additive as required. Examples of the additive include a cross-linking agent, a tackifier, a plasticizer, a pigment, a dye, a filler, an age resistor, a conductive material, a UV absorber, a light stabilizer, a release modifier, a softener, a surfactant, a flame retardant, and an antioxidant. Examples of the cross-linking agent include an isocyanate-based cross-linking agent, an epoxy-based cross-linking agent, a peroxide-based cross-linking agent, a melamine-based cross-linking agent, a urea-based cross-linking agent, a metal alkoxide-based cross-linking agent, a metal chelate-based cross-linking agent, a metal salt-based cross-linking agent, a carbodiimide-based cross-linking agent, an oxazoline-based cross-linking agent, an aziridine-based cross-linking agent, and an amine-based cross-linking agent.

The modulus of elasticity at 23° C. (storage modulus of elasticity) of the pressure-sensitive adhesive layer may be preferably from $1\times10^{-5}$ GPa to $1\times10^{-2}$ GPa, more preferably from $5.0\times10^{-5}$ GPa to $5.0\times10^{-3}$ GPa, still more preferably from $1.0\times10^{-4}$ GPa to $1.0\times10^{-3}$ GPa. The pressure-sensitive adhesive layer having such modulus of elasticity may contribute to improvements in impact resistance and handleability at the time of bonding. In addition, when the pressure-sensitive adhesive layer having such modulus of elasticity is incorporated, the pressure-sensitive adhesive layer may function as an impact relaxation layer in the case where the light control element having an elongated shape is taken up into a roll shape.

The thickness (dry thickness) of the pressure-sensitive adhesive layer is determined depending on desired adhesion (peel strength). The thickness (dry thickness) of the pressure-sensitive adhesive layer may be set to preferably from about 20 μm to about 200 μm, more preferably from 20 μm to 150 μm, still more preferably from 25 μm to 100 μm.

A-7. Production Method for Light Control Element

The above-mentioned light control element may be produced by any appropriate method. A case of producing the light control element including the light control layer containing a liquid crystal compound by a roll-to-roll process is illustratively described below. A light control film may be obtained, for example, by a method involving: unwinding, from a roll, an elongated resin film with a transparent electrode layer in which the transparent electrode layer has been formed on one surface in advance; while conveying the resin film with a transparent electrode layer in a lengthwise direction, applying a composition for forming a light control layer on the surface of the transparent electrode layer to form an application layer; continuously laminating, on the application layer, an elongated glass film with a transparent electrode layer in which the transparent electrode layer has been formed on one surface in advance so that the transparent electrode layer of the glass film faces the application layer and the elongated directions of the resin film and the glass film match with each other, to thereby form a laminate; curing the application layer to obtain a light control film; continuously laminating an elongated release film with a pressure-sensitive adhesive layer separately prepared so that the pressure-sensitive adhesive layer faces the surface of the resin film of the light control film and the elongated directions of the release film and the light control film match with each other, to thereby obtain a light control element; and taking up the obtained light control element into a roll shape. In this case, the composition for forming a light control layer contains, for example, a monomer (preferably, an active energy ray-curable monomer) for forming a polymer matrix and a liquid crystal compound.

B. Glass Film Roll with Light Control Layer

A glass film roll with a light control layer according to one embodiment of the present invention includes a glass film having an elongated shape having a thickness of from 50 μm to 200 μm, and a light control layer laminated on one side of the glass film. The glass film roll with a light control layer typically includes a glass film, a light control layer, a resin film, and a pressure-sensitive adhesive layer in the stated order. As the glass film, the light control layer, the resin film, and the pressure-sensitive adhesive layer, the ones described in the section A are preferably used. The glass film roll with a light control layer may be the light control element described in the section A which has been formed into an elongated shape and taken up into a roll shape.

The glass film roll with a light control layer has a light weight and high reliability (e.g., impact resistance and scratch resistance), and when a pressure-sensitive adhesive layer is incorporated therein, the glass film roll with a light control layer can easily be bonded to a glass surface or the like.

EXAMPLES

The present invention is specifically described below byway of Examples, but the present invention is by no means limited to these Examples. In addition, in the following description, the expressions "part(s)" and "%" mean "part (s) by weight" and "wt %", respectively, unless otherwise specified.

<Measurement Method for Modulus of Elasticity>

(Modulus of Elasticity of Resin Film)

A strip-shaped sample having a thickness of 50 μm, a width of 2 cm, and a length of 15 cm was produced, and its modulus of elasticity was measured with an autograph (manufactured by Shimadzu Corporation, AG-I) from the elongation of the strip-shaped sample in its lengthwise direction and a stress. The test conditions were as follows: a chuck-to-chuck distance was set to 10 cm, and a tensile rate was set to 10 mm/min.

(Modulus of Elasticity of Pressure-Sensitive Adhesive)

The storage modulus of elasticity at 23° C. of a pressure-sensitive adhesive layer was measured with a viscoelasticity-measuring apparatus ARES (manufactured by TA Instruments, Inc.). Specifically, the pressure-sensitive adhesive layer was formed into a sheet shape having a thickness of 2 mm, and the sheet was punched into a shape in accordance with parallel plates each having a diameter of 25 mm, followed by its mounting between the chucks of the apparatus. Then, under a condition in which the temperature of the layer was increased from −70° C. to 150° C. at a temperature increase rate of 5° C./min while strain was applied thereto at a frequency of 1 Hz, its storage modulus of elasticity at 23° C. was measured.

<Measurement Method for Thickness>

A thickness was measured with a dial gauge.

Production Example 1: Production of Pressure-Sensitive Adhesive Composition A 100 Parts by weight of butyl acrylate, 5 parts by weight of acrylic acid, 0.1 part by weight of 2-hydroxyethyl acrylate, 0.2 part by weight of 2,2'-azobisisobutyronitrile serving as a polymerization initiator, and 200 parts by weight of ethyl acetate serving as a polymerization solvent were loaded into a four-necked flask including a stirring blade, a temperature gauge, a nitrogen gas-introducing tube, and a condenser. After air in the flask had been sufficiently purged with nitrogen, the mixed liquid, whose temperature in the flask was kept at around 55° C., was subjected to a polymerization reaction for 10 hours while being stirred in a stream of nitrogen. Thus, an acrylic polymer solution was prepared.

100 Parts by weight of the solid content of the acrylic polymer solution was uniformly mixed with 0.5 part by weight of a trimethylolpropane-tolylene diisocyanate adduct (manufactured by Nippon Polyurethane Industry Co., Ltd., CORONATE L) serving as an isocyanate-based cross-linking agent and 0.1 part by weight of a silane coupling agent (manufactured by Shin-Etsu Chemical Co., Ltd., KBM- 403), followed by stirring. Thus, an acrylic pressure-sensitive adhesive composition A was prepared.

Example 1

A transparent electrode layer (ITO layer) was formed on one surface of a transparent PET base material (manufactured by Mitsubishi Chemical Corporation, "DIAFOIL", thickness: 188 μm, modulus of elasticity: 4.0 GPa) by sputtering. Thus, a PET film with an electrode layer was obtained.

A transparent electrode layer (ITO layer) was formed on one surface of a glass film (manufactured by Nippon Electric Glass Co., Ltd., "OA-10G", thickness: 150 μm) by sputtering. Thus, a glass film with an electrode layer was obtained.

In a PET film in which one surface thereof had been subjected to release treatment, the pressure-sensitive adhesive composition A was applied onto the release treatment surface, followed by drying. Thus, a release film with a pressure-sensitive adhesive layer was obtained. The pressure-sensitive adhesive layer had a thickness of 50 μm and a modulus of elasticity of $4\times10^{-4}$ GPa.

The PET film with an electrode layer and the glass film with an electrode layer were bonded to each other through intermediation of a composition for forming a light control layer (polymer-dispersed liquid crystal layer), which contained nematic liquid crystal molecules and 1,6-hexanediol diacrylate (manufactured by Nippon Kayaku Co., Ltd., "HDDA"), so that the ITO layers faced each other. After that, the composition for forming a polymer-dispersed liquid crystal layer was cured. Thus, a laminate was obtained.

Next, the release film with a pressure-sensitive adhesive layer was laminated on the laminate so that the pressure-sensitive adhesive layer faced the PET film.

As described above, a light control element having a configuration of [glass film/transparent electrode layer/light control layer/transparent electrode layer/resin film/pressure-sensitive adhesive layer/release film] was obtained. The thickness of the light control element from the glass film to the pressure-sensitive adhesive layer was 408 μm.

Example 2

A light control element having a configuration of [glass film/transparent electrode layer/light control layer/transparent electrode layer/resin film/pressure-sensitive adhesive layer/release film] was obtained in the same manner as in Example 1 except that a transparent PET base material (manufactured by Mitsubishi Chemical Corporation, "DIAFOIL", thickness: 50 μm, modulus of elasticity: 4.0 GPa) was used as the resin film, and a glass film (manufactured by Nippon Electric Glass Co., Ltd., "OA-10G", thickness: 100 μm) was used as the glass film. The thickness of the light control element from the glass film to the pressure-sensitive adhesive layer was 220 μm.

Example 3

A light control element having a configuration of [glass film/transparent electrode layer/light control layer/transparent electrode layer/resin film/pressure-sensitive adhesive layer/release film] was obtained in the same manner as in Example 1 except that a transparent PET base material (manufactured by Mitsubishi Chemical Corporation, "DIAFOIL", thickness: 50 μm, modulus of elasticity: 4.0 GPa) was used as the resin film, a glass film (manufactured by Nippon Electric Glass Co., Ltd., "OA-10G", thickness: 70 μm) was used as the glass film, and the thickness of the pressure-sensitive adhesive layer was changed to 20 μm. The thickness of the light control element from the glass film to the pressure-sensitive adhesive layer was 160 μm.

Comparative Example 1

A light control element having a configuration of [glass film/transparent electrode layer/light control layer/transparent electrode layer/resin film/pressure-sensitive adhesive layer/release film] was obtained in the same manner as in Example 1 except that a glass film (manufactured by Nippon Electric Glass Co., Ltd., "OA-10G", thickness: 300 μm) was used as the glass film. The thickness of the light control element from the glass film to the pressure-sensitive adhesive layer was 558 μm.

Comparative Example 2

A light control element having a configuration of [first resin film/transparent electrode layer/light control layer/transparent electrode layer/second resin film/pressure-sensitive adhesive layer/release film] was obtained in the same manner as in Example 1 except that a transparent PET base material (manufactured by Mitsubishi Chemical Corporation, "DIAFOIL", thickness: 50 μm, modulus of elasticity: 4.0 GPa) was used as the resin film, a transparent PET base material (manufactured by Mitsubishi Chemical Corporation, "DIAFOIL", thickness: 100 μm) was used instead of the glass film, and the thickness of the pressure-sensitive adhesive layer was changed to 20 μm. The thickness of the light control element from the first resin film to the pressure-sensitive adhesive layer was 190 μm.

Comparative Example 3

A light control element having a configuration of [glass film/transparent electrode layer/light control layer/transparent electrode layer/resin film/pressure-sensitive adhesive layer/release film] was obtained in the same manner as in Example 1 except that a transparent PET base material (manufactured by Mitsubishi Chemical Corporation, "DIAFOIL", thickness: 300 μm, modulus of elasticity: 4.0 GPa) was used as the resin film, and a glass film (manufactured by Nippon Electric Glass Co., Ltd., "OA-10G", thickness: 100 μm) was used as the glass film. The thickness of the light control element from the glass film to the pressure-sensitive adhesive layer was 470 μm.

Comparative Example 4

A light control element having a configuration of [glass film/transparent electrode layer/light control layer/transparent electrode layer/resin film/pressure-sensitive adhesive layer/release film] was obtained in the same manner as in Example 1 except that a transparent PET base material (manufactured by Mitsubishi Chemical Corporation, "DIAFOIL", thickness: 50 μm, modulus of elasticity: 4.0 GPa) was used as the resin film, a glass film (manufactured by Nippon Electric Glass Co., Ltd., "OA-10G", thickness: 35 μm) was used as the glass film, and the thickness of the pressure-sensitive adhesive layer was changed to 20 μm. The thickness of the light control element from the glass film to the pressure-sensitive adhesive layer was 125 μm.

The above-mentioned light control elements obtained in Examples and Comparative Examples were subjected to the following characteristic evaluation. The results are shown in Table 1.

<Bending Radius>

A plurality of poles made of vinyl chloride having different radii were prepared so that their radii were ranged from 20 mm to 100 mm increments of 10 mm. Under an environment at 23° C., a sample of the light control element from which the release film had been peeled off was bent along any one of the poles so that its glass film side (in Comparative Example 2, its first resin film side) faced outward, the degree of bending of the sample was confirmed as to whether both sides thereof were able to be fixed with CELLOTAPE (manufactured by Nichiban Co., Ltd, "CT405AP-24", pressure-sensitive adhesive strength: 3.93 N/10 cm) or could not be fixed with CELLOTAPE, or the sample broke, and the minimum radius of the poles to which both the sides were able to be fixed without breakage was regarded as the bending radius thereof. The size of the sample was as follows: the length of its short side was set to 20 mm, and the length of its long side was set to the radius of the outer diameter of each pole.

<Impact Resistance>

The light control element having a size of 5 cm by 5 cm from which the release film had been peeled off was bonded to a glass sheet to provide an evaluation sample. A puncture rod (φ0.5 mm) was dropped onto the sample from a height of 10 cm at a rate of 20 mm/min, and the breakage of the glass film was observed. The impact resistance was evaluated based on the following criteria.

Satisfactory: No breakage is observed

Poor: A breakage is observed

<Scratch Resistance>

Steel wool #1000 was uniformly attached to a smooth sectional surface of a cylinder having a diameter of 25 mm. A sample of the light control element was arranged thereon so that its surface on a glass film side (in Comparative Example 2, its surface on a first resin film side) was brought into contact with the steel wool, and was reciprocated 30 times at a rate of about 100 mm/sec at a load of 1.5 kg. After that, the scratch resistance was judged by visual evaluation based on the following criteria.

Satisfactory: No flaw is observed, or a slight flaw is observed but visibility is not affected Poor: An obvious flaw is observed, and visibility is impaired As shown in Table 1, it is found that each of the light control elements of Examples is satisfactory in each of impact resistance and scratch resistance, and thus has high reliability. In addition, when the light control element is bonded to a window or the like, its glass surface serves as an exposure surface, and hence the light control element may be excellent in durability. Further, the light control element had a light weight and appropriate flexibility, and hence was excellent in handleability at the time of bonding. Meanwhile, each of the light control elements of Comparative Examples was insufficient in any of impact resistance and scratch resistance, or was insufficient in flexibility, resulting in a problem in handleability at the time of bonding.

INDUSTRIAL APPLICABILITY

The present invention is suitably used in the field of a light control film.

REFERENCE SIGNS LIST

100 light control element
10 glass film
20 light control layer
30 resin film
40 pressure-sensitive adhesive layer

The invention claimed is:

1. A light control element, comprising a glass film, a light control layer, a resin film, and a pressure-sensitive adhesive layer in the stated order, wherein the light control element has a bending radius of from 20 mm to 100 mm, wherein the glass film has a thickness of from 50 μm to 200 μm, wherein the light control layer contains a liquid crystal compound, an electrochromic material, or a gasochromic material, and the pressure-sensitive adhesive layer is directly formed on the resin film.

2. The light control element according to claim 1, wherein the resin film has a thickness of from 20 μm to 200 μm, and

TABLE 1

| | Glass film | Resin film | | Pressure-sensitive adhesive layer | | | | | |
|---|---|---|---|---|---|---|---|---|---|
| | Glass film Thickness (μm) | Thickness (μm) | Modulus of elasticity (GPa) | Thickness (μm) | Modulus of elasticity (GPa) | Total thickness (μm) | Bending radius (mm) | Impact resistance | Scratch resistance |
| Example 1 | 150 | 188 | 4.0 | 50 | $4 \times 10^{-4}$ | 408 | 100 | Satisfactory | Satisfactory |
| Example 2 | 100 | 50 | 4.0 | 50 | $4 \times 10^{-4}$ | 220 | 70 | Satisfactory | Satisfactory |
| Example 3 | 70 | 50 | 4.0 | 20 | $4 \times 10^{-4}$ | 160 | 50 | Satisfactory | Satisfactory |
| Comparative Example 1 | 300 | 188 | 4.0 | 50 | $4 \times 10^{-4}$ | 558 | >100 | Satisfactory | Satisfactory |
| Comparative Example 2 | 100 (First resin film) | 50 | 4.0 | 20 | $4 \times 10^{-4}$ | 190 | <20 | Satisfactory | Poor |
| Comparative Example 3 | 100 | 300 | 4.0 | 50 | $4 \times 10^{-4}$ | 470 | >100 | Satisfactory | Satisfactory |
| Comparative Example 4 | 35 | 50 | 4.0 | 20 | $4 \times 10^{-4}$ | 125 | 30 | Poor | Satisfactory |

wherein the resin film has a modulus of elasticity at 23° C. of from 2 GPa to 10 GPa.

3. The light control element according to claim 1, wherein the pressure-sensitive adhesive layer has a thickness of from 20 μm to 200 μm, and wherein the pressure-sensitive adhesive layer has a modulus of elasticity at 23° C. of from $1\times10^{-5}$ GPa to $1\times10^{-2}$ GPa.

4. The light control element according to claim 1, wherein a thickness of the light control element from the glass film to the pressure-sensitive adhesive layer is from 70 μm to 500 μm.

5. A glass film roll with a light control layer, comprising a glass film having an elongated shape and a light control layer, a resin film, and a pressure-sensitive adhesive layer each laminated on one side of the glass film in the stated order, wherein the glass film has a thickness of from 50 μm to 200 μm, wherein the light control layer contains a liquid crystal compound, an electrochromic material, or a gasochromic material, and the pressure-sensitive adhesive layer is directly formed on the resin film.

6. The light control element according to claim 1, wherein the resin film has a thickness of from 30 μm to 150 μm.

7. The light control element according to claim 1, wherein the resin film has a modulus of elasticity at 23° C. of from 2 GPa to 6 GPa.

8. The light control element according to claim 1, wherein the pressure-sensitive adhesive layer has a modulus of elasticity at 23° C. of from $1.0\times10^{-4}$ GPa to $1.0\times10^{-3}$ GPa.

9. The light control element according to claim 1, wherein the light control layer contains a polymer matrix and a liquid crystal compound dispersed in the polymer matrix.

10. The light control element according to claim 9, wherein the light control layer has a thickness of from 15 μm to 60 μm.

* * * * *